US008290424B2

(12) United States Patent
Shen et al.

(10) Patent No.: US 8,290,424 B2
(45) Date of Patent: Oct. 16, 2012

(54) ANTENNA SYSTEM FOR SATELLITE LOCK-ON AND METHOD FOR OPERATING THE SAME

(75) Inventors: Wen-Chao Shen, Taoyuan (TW); Wen-Yen Shen, Taoyuan (TW); Shun-Ching Chen, Taipei County (TW)

(73) Assignee: Azure Shine International Inc., Taoyuan (TW)

(*) Notice: Subject to any disclaimer, the term of this patent is extended or adjusted under 35 U.S.C. 154(b) by 834 days.

(21) Appl. No.: 12/401,884

(22) Filed: Mar. 11, 2009

(65) Prior Publication Data

US 2009/0328110 A1 Dec. 31, 2009

(30) Foreign Application Priority Data

Jun. 30, 2008 (TW) .............................. 97124574 A

(51) Int. Cl.
*H01G 3/00* (2006.01)
*G01S 13/06* (2006.01)

(52) U.S. Cl. ...................................... 455/3.02; 342/359

(58) Field of Classification Search ........... 340/995.12–995.15, 995; 455/3.02, 455/130; 701/207–209; 342/359, 75
See application file for complete search history.

(56) References Cited

U.S. PATENT DOCUMENTS

| | | | | |
|---|---|---|---|---|
| 7,239,274 | B2 * | 7/2007 | Lee et al. | 342/359 |
| 7,696,926 | B2 * | 4/2010 | Son et al. | 342/359 |
| 7,990,283 | B2 * | 8/2011 | Breed | 340/903 |
| 2010/0058399 | A1 * | 3/2010 | Shen et al. | 725/72 |

* cited by examiner

*Primary Examiner* — Dinh T. Le
(74) *Attorney, Agent, or Firm* — Rosenberg, Klein & Lee

(57) ABSTRACT

An antenna system and a corresponding method for satellite lock-on applied to vehicles automatically lock on at least one satellite in the space by means of a lock-on signal. The technique features on a scan driving signal that initiates a space scan of the antenna system so as to obtain a scan data. According to peak values of the scan data, coordinates of a plurality of satellites in the space are realized and individually recorded. Then, after receiving a lock-on signal, the satellite coordinate of the satellite to be locked is retrieved so as to drive the antenna to point at the satellite to be locked.

38 Claims, 10 Drawing Sheets

| | | | | | | |
|---|---|---|---|---|---|---|
| Scan Coordinate | P00 | P10 | P20 | P30 | • | • • • |
| Signal Strength | 3 | 5 | 5 | 5 | • | • • • |
| Scan Coordinate | P01 | P11 | P21 | P31 | • | • • • |
| Signal Strength | 5 | 15 | 6 | 7 | • | • • • |
| Scan Coordinate | P02 | P12 | P22 | P32 | • | • • • |
| Signal Strength | 4 | 7 | 6 | 3 | • | • • • |
| Scan Coordinate | P03 | P13 | P23 | P33 | • | • • • |
| Signal Strength | 5 | 5 | 18 | 6 | • | • • • |
| • | • | • | • | • | • | • • • |
| • | • | • | • | • | • | • • • |
| • | • | • | • | • | • | • • • |
| • | • | • | • | • | • | • • • |
| • | • | • | • | • | • | • • • |

FIG.4

| Satellite No. | Satellite Position Data | | |
|---|---|---|---|
| | Satellite Coordinate | Vehicle Coordinate | |
| | | Satellite Position Coordinate | Vehicle Position |
| 0001 | (Δθ,Δφ) | (L0,A0) | (ΔAZ0,ΔE) |
| 0002 | (2Δθ,3Δφ) | (L0,A0) | (ΔAZ0,ΔE) |
| · | · | · | · |
| · | · | · | · |
| · | · | · | · |
| · | · | · | · |
| · | · | · | · |

FIG.8

ANTENNA SYSTEM FOR SATELLITE LOCK-ON AND METHOD FOR OPERATING THE SAME

This application claims the benefit of Taiwan Patent Application Serial No. 097124574, filed Jun. 30, 2008, the subject matter of which is incorporated herein by reference.

BACKGROUND OF THE INVENTION (1) Field of the Invention

The invention relates to a technology for locking on a specific satellite, and more particularly to the technology that utilizes scanned data to lock on the target satellites.

(2) Description of the Prior Art

Satellite technology has been improving human life in its various aspects. In daily life, positioning apparatuses, mobile phones, broadcasting apparatuses, navigation devices, and other devices using global positioning system (GPS) had drawn people closer geographically and had visualized the image of global community. In particular, the achievement in broadcasting via satellites has realized the “real-time” TV programs in broadcasting industry, and has made it possible to play varieties of programs at any corner around the world.

In the prior art, the satellite broadcasting technology can he roughly classified into a type of stationary broadcasting or a type of mobile broadcasting. The type of stationary broadcasting is to have a satellite antenna system mounted on the ground or at a suitable fixed construction. In such type of broadcasting, satellite parameters are initially downloaded, then the antenna system is actuated to aim at the target satellite, and to establish a bi-directional signal and data link between the station and the satellite. The type of stationary broadcasting can only provide a limited space coverage, due to its immobility, and it is quite possibly that the signal broadcasted as DVB-T (Digital Video Broadcasting-Terrestrial) cannot be reached.

For the aforesaid disadvantage of limited space coverage in the stationary broadcasting, the mobile broadcasting, provides an alternative solution thereto, One of the main applications in the mobile broadcasting is the satellite news gathering (SNG) vehicle, The SNG vehicle provides an on-top antenna system for tracking satellites and for processing bi-directional signal and data communication as soon as the target satellite is locked on.

In the case that the tracking target of the antenna system for mobile broadcasting is shifted from one satellite to another, the satellite parameters of another satellite are needed to be pre-stored in the database of the antenna system in order to establish an effective communication between the satellites and the ground, In practice, the database of the antenna system can pre-store parameters of all prospective satellites in the space, and actually a change in the satellite tracking is as simple as a task of control choice in operating the antenna system. According to the satellite parameters (especially the coordinate parameters), the antenna dish of the antenna system can be precisely pivoted to direct the target satellite, Alternatively, the antenna system can also obtain the satellite parameters from an earth satellite transmission station or a satellite control center, while a new tracking starts.

In practice, the ability of an antenna system to successfully lock on an orbiting satellite, it mainly depends on the following three coordinate factors: celestial coordinates of the satellite including a right ascension (R.A.) angle (RA angle, hereinafter) and a declination (Decl.) angle (Decl angle, hereinafter), geographic coordinates of the antenna system (i.e. the SNG vehicle) including longitude and a latitude, and the pointing angles of attitude related to the vehicle including an azimuth angle and an elevation angle.

In the prior art, the final orientation of the antenna pointing to the specified satellite is primarily decided by combining those satellite coordinates and those corrected parameters related to an azimuth angle and an elevation angle which had been initially integrated into a satellite antenna system. However, the vehicle of the antenna system moves arbitrarily and is subjected to possible mechanical vibrations, certain deviations might be expected during the process of satellite tracking carried out by the antenna configured onboard of the vehicle by adopting those corrected parameters which had been accepted as reference values initially. Consequently, after a substantial period of operation by using the satellite data input and coordinate captured, it is questionable to maintain the mobile satellite dish to precisely lock on the target satellite.

Therefore, an improved satellite lock-on technique for a mobile antenna system to precisely and promptly lock on an orbiting satellite definitely provides a technical solution to the ordinary person skilled in the art.

SUMMARY OF THE INVENTION

Accordingly, it is an object of the present invention to provide an antenna system for satellite lock-on and a corresponding method for operating the antenna system, in which instant scan data of the antenna system mounted on a mobile vehicle can be used to refresh position states of the antenna system and the vehicle so as to precisely perform the tracking and locking-on of an orbiting satellite from various satellites in the space.

In the present invention, the antenna system and the accompanying method can automatically lock on at least a satellite according to the respective lock-on signals. A scan-driving signal of the present invention is to drive the antenna device of the antenna system to perform a space scanning so as to obtain a scan data. By comparing peak values of the scan data to the respective pre-stored satellite parameters, the satellite coordinates of individual satellites in the space within the scanning range of the antenna device can be more precisely defined. At the same time, satellite coordinates for all those prospective satellites are recorded. After a target satellite is determined, the respective satellite coordinates of the target satellite are retrieved and thereby the antenna device can then be correctly directed to the target satellite.

In the present invention, to have the antenna device more accurately direct to and lock on the target satellite, both the satellite coordinates and the vehicle coordinates of the antenna system are applied.

By providing the system and the method for locking on the target satellite in means of pre-scanning according to the present invention, real-time states of the vehicle, the antenna device and the target satellite can be obtained. Thereby, adjustment upon the antenna device for precisely pointing the target satellite can be carried out immediately. Therefore, by the present invention, all possible mechanical deviations in the antenna tracking system can be properly compensated. Thus, quality in transmitting and/or receiving satellite signals of the antenna system can be substantially upgraded.

All these objects are achieved by the antenna system for satellite lock-on and the method for operating the antenna system described below.

BRIEF DESCRIPTION OF THE DRAWINGS

The present invention will be specified with reference to its preferred embodiments illustrated in the drawings, in which:

FIG. 4 illustrates how those scanned data are analyzed and the relative peak values and corresponding coordinates are determined by scanned from the first embodiment of the present invention;

FIG. 8 illustrates a table to record the satellites' positions from performing the method for operating the antenna system in accordance with the present invention;

DESCRIPTION OF THE PREFERRED EMBODIMENT

The invention disclosed herein is directed to an antenna system for satellite lock-on and a corresponding method for operating the antenna system. In the following description, numerous details are set forth in order to provide a thorough understanding of the present invention. It will be appreciated by one skilled in the art that variations of these specific details are possible while still achieving the results of the present invention. Under such a circumstance, there are two preferred embodiments described herein and a flowchart applied for both embodiments is provided to illustrate the present invention in details.

Figure 1:
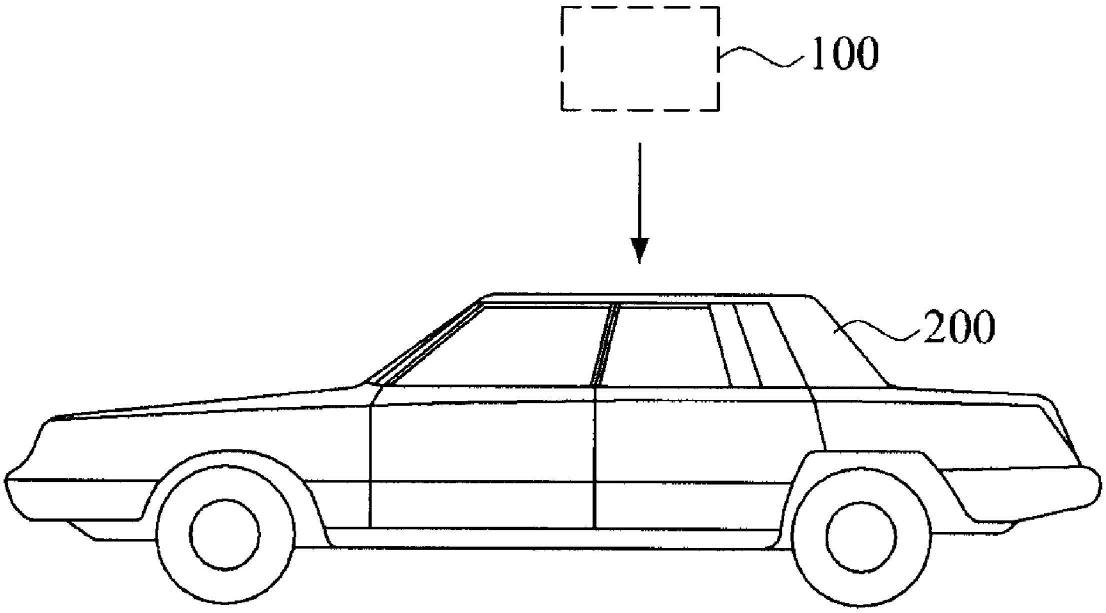
FIG. 1 is a schematic view of a vehicle equipped with an antenna system in accordance with the first embodiment of the present invention.
Figure 2:
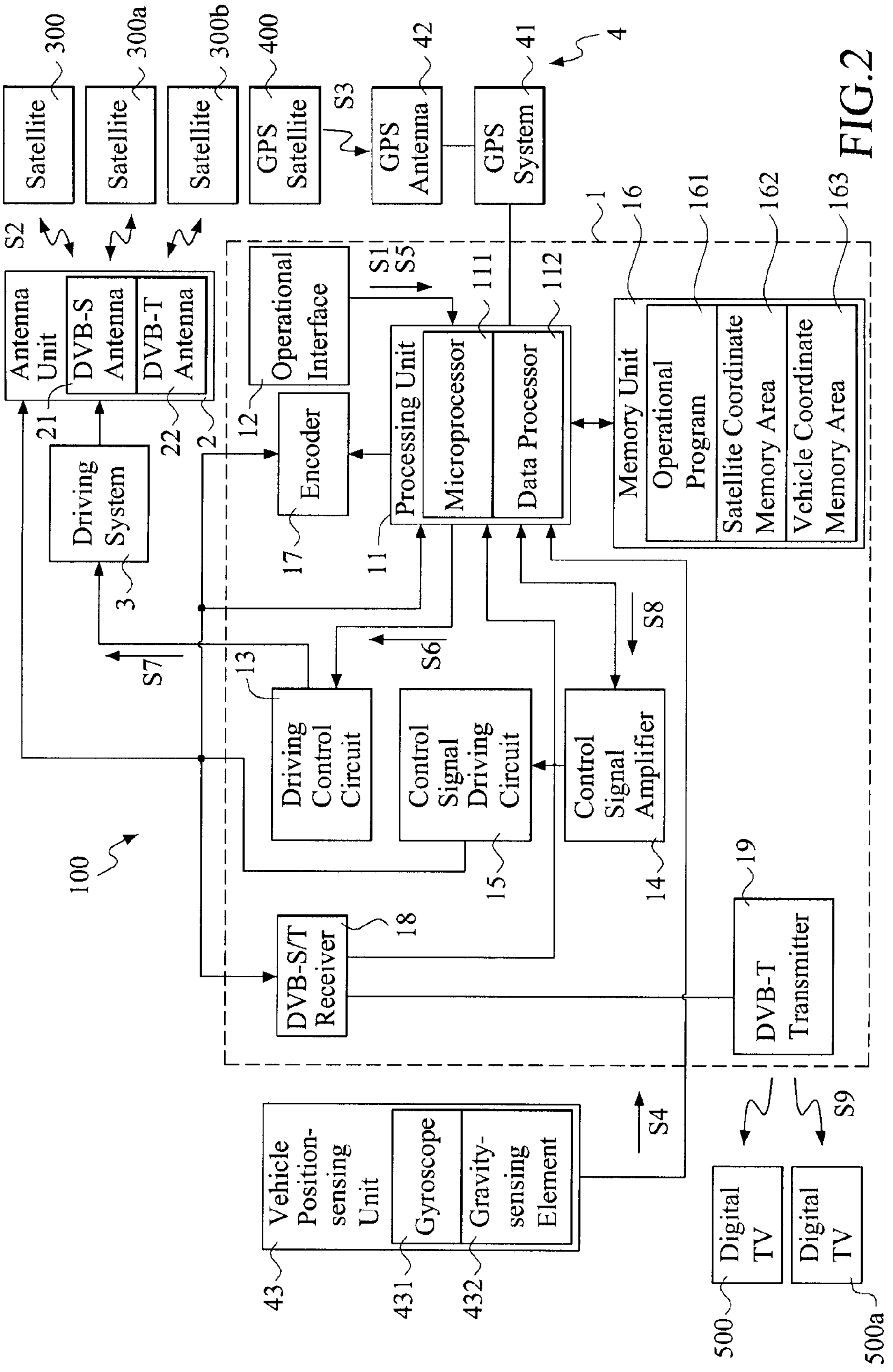
FIG. 2 is a functional block diagram of the first embodiment of the present invention.

Referring now to FIG. 1 and FIG. 2, in the first embodiment of the present invention, an antenna system 100 mounted on a carrier vehicle 200 includes a signal control box 1, an antenna unit 2 (for transmitting/receiving), a driving unit 3, and a positioning unit 4. The carrier vehicle 200 of the present invention can be a craft applied in waters, at land, or in the air. Also shown in FIG. 2, three prospective satellites 300, 300*a*, and 300*b* are communicationally reachable by the antenna system 100 in the space.

In the following description, terminologies DVB-T, DVB-S and DVB-S/T are adopted. However, it is well known that, in some area of the planet, different terminologies might be used though the contents and elements involved are the same; for example, the DMB-T/H specs in China, and the ATSC (Advanced television systems committee) specs in USA The signal control box 1 is coupled with the antenna unit 2 through the driving unit 3 arid further includes a processing unit 11, an operational interface 12, a driving-control circuit 13, a control signal amplifier 14, a control signal driving circuit 15, a memory unit 16, an encoder 17, a digital video broadcasting-satellite/terrestrial (DVB-S/T) receiver 18, and a digital video broadcasting-terrestrial (DVB-T) transmitter 19.

The processing unit 11 further includes a microprocessor 111 and a data processor 112. The operational interface 12 coupled with the processing unit 11 can be configured as an operation panel. The driving-control circuit 13 is coupled with the processing unit 11 and the driving unit 3. The control signal amplifier 14 is also coupled with the processing unit 11. The control signal driving circuit 15 is coupled with the control signal amplifier 14, the DVB-S/T receiver 18 and the antenna unit 2.

The memory unit 16 coupled with the processing unit 11 further includes an operational program 161, a satellite coordinate memory area 162 and a vehicle coordinate memory area 163. The encoder 17 is coupled with the processing unit 11, DVB-S/T receiver 18 and the antenna unit 2. The DVB-S/T receiver 18 is coupled with the processing unit 11, the DVB-T transmitter 19 and the antenna unit 2.

In the embodiment shown in FIG. 2, the antenna unit 2 includes a digital video broadcasting-satellite (DVB-S) antenna 21 and a digital video broadcasting-terrestrial (DVB-T) antenna 22, in which the DVB-S antenna 21 can be a dish antenna or a flat antenna. The driving unit 3 can be a step motor for driving the DVB-S antenna 21 and the DVB-T antenna 22. In practice, the antenna unit 2 can only include the DVB-S antenna 21, or can be a combination including at least one DVB-S antenna 21 and at least one DVB-T antenna 22.

Generally, the adjustment of the attitude related to an antenna includes its azimuth angle and elevation angle. The positioning unit 4 as shown includes a GPS system 41, a GPS antenna 42 and a vehicle position-sensing unit 43. The GPS system 41 couples in between with the GPS antenna 42 and the processing unit 11. The vehicle position-sensing unit 43 couples the processing unit 11 and further includes a gyroscope 431 and a gravity-sensing element 432.

In this embodiment shown in FIG. 2, the operational interface 12 is utilized to set up a scan pattern (for example, a horizontal scan or a vertical scan) and related scan parameters (such as a range of a scan angle, an angular increment in scanning, a scan frequency and so on). The operational interface 12 can be triggered and generate a scan-driving signal S1 to processing unit 11. According to the signal S1, the processing unit 11 would activate the driving unit 3 through the driving-control circuit 13 to drive the DVB-S antenna 21 for a space scanning in accordance with the preset scan pattern and scan parameters. Consequently, a set of data via scanning can be obtained.

Figure 3:
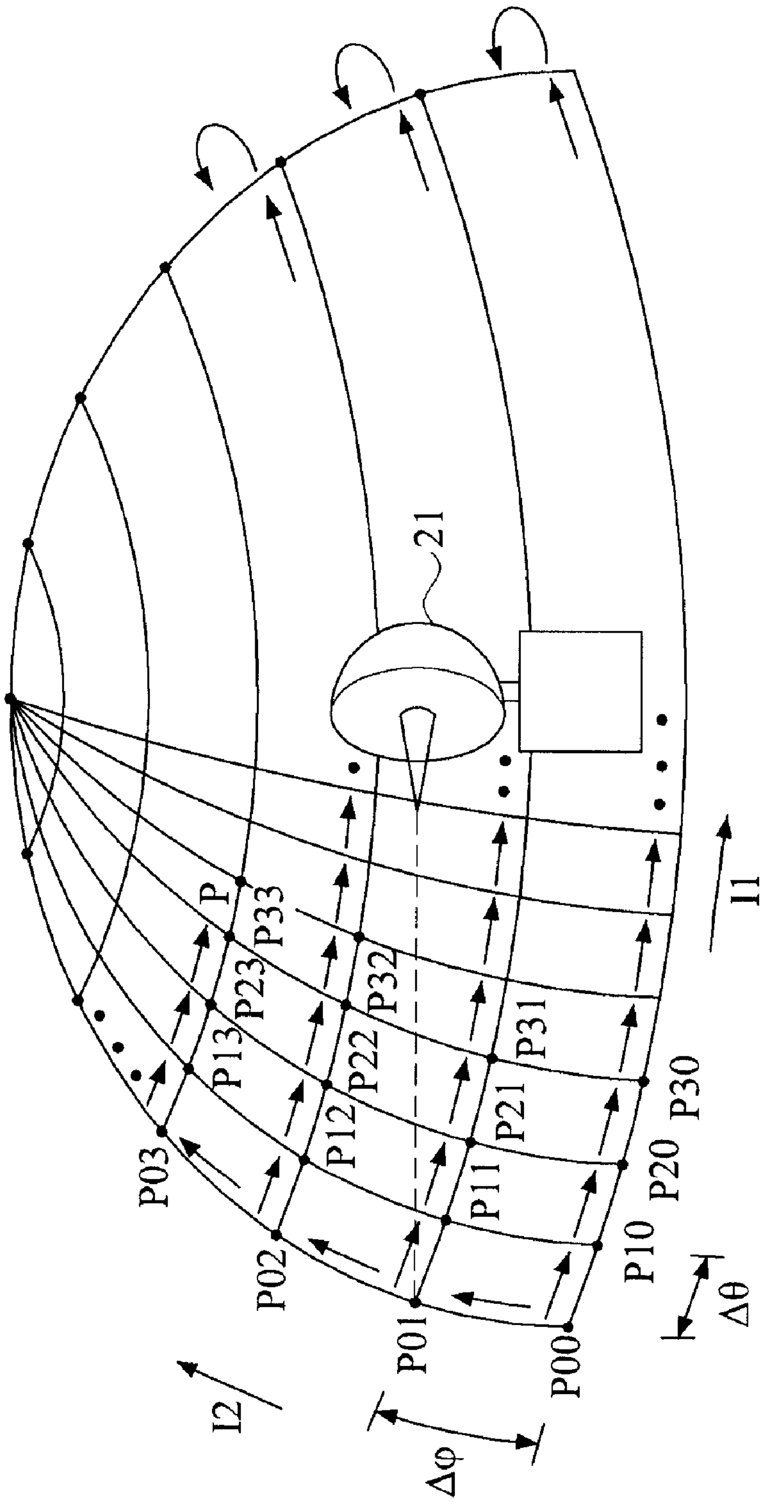
FIG. 3 illustrates a schematic view of a horizontal scanning adopted by DVB-S antenna to obtain scanned data in the first embodiment of the present invention.

FIG. 3 illustrates a horizontal scan of the first embodiment of the DVB-S antenna 21 and FIG. 4 tables some peak values of signal strengths with respect to the specific scan coordinates. In the horizontal scanning of FIG. 3, the angular increment in the azimuth angle along the horizontal direction 11 per a scan cycle is defined as a $\Delta\theta$, while the angular increment in the elevation angle in the scan cycles is defined as a $\Delta\Phi$.

During the scanning, some specific scan coordinates would be defined in advance for recording the scan data, for example coordinates P00~P33 in FIG. 3. While in scanning, the DVB-S antenna 21 would capture satellite signals S2 upon meeting the preset scan coordinates. A typical example of the signal strengths with respect to corresponding scan coordinates is tabled in FIG. 4. In the art, the signal strength can be realized by the induced voltage or the power variation.

For example in FIG. 4, a local maximum or peak signal strength is found in P11 among the neighboring P01, P10, P21 and P12 (with signal strengths 5, 5, 6 and 7, respectively). If a further analysis can confirm that the peak value in P11 is not a result of local perturbation or signal interface, it is no doubt that the DVB-S antenna 21 at P11 is pointing at a satellite (possible any of satellite 300, 3001 and 300*b*). Then, P11 can be assigned to be one of the satellite coordinates.

Similarly in FIG. 4, another satellite coordinate of another satellite can be confirmed to be the P23. In the present invention, the satellite coordinates with respect to the corresponding scan coordinates P11 and P23 can be defined as coordinates (Δθ, ΔΦ) and (2Δθ, 3ΔΦ), respectively, and further these two satellite coordinates can be stored into the satellite coordinate memory area 162 of the memory unit 16.

In the preceding description, each horizontal scanning follows a horizontal direction I1 with the angular increment in the elevation. Alternatively, each scanning can be started along the vertical direction I2 of FIG. 3 with the angular increment in the azimuth. Furthermore, while analyzing the satellite coordinates, the result can be obtained by comparing preset reference values with those signal strength caught by the DVB-S antenna 21.

Figure 5:
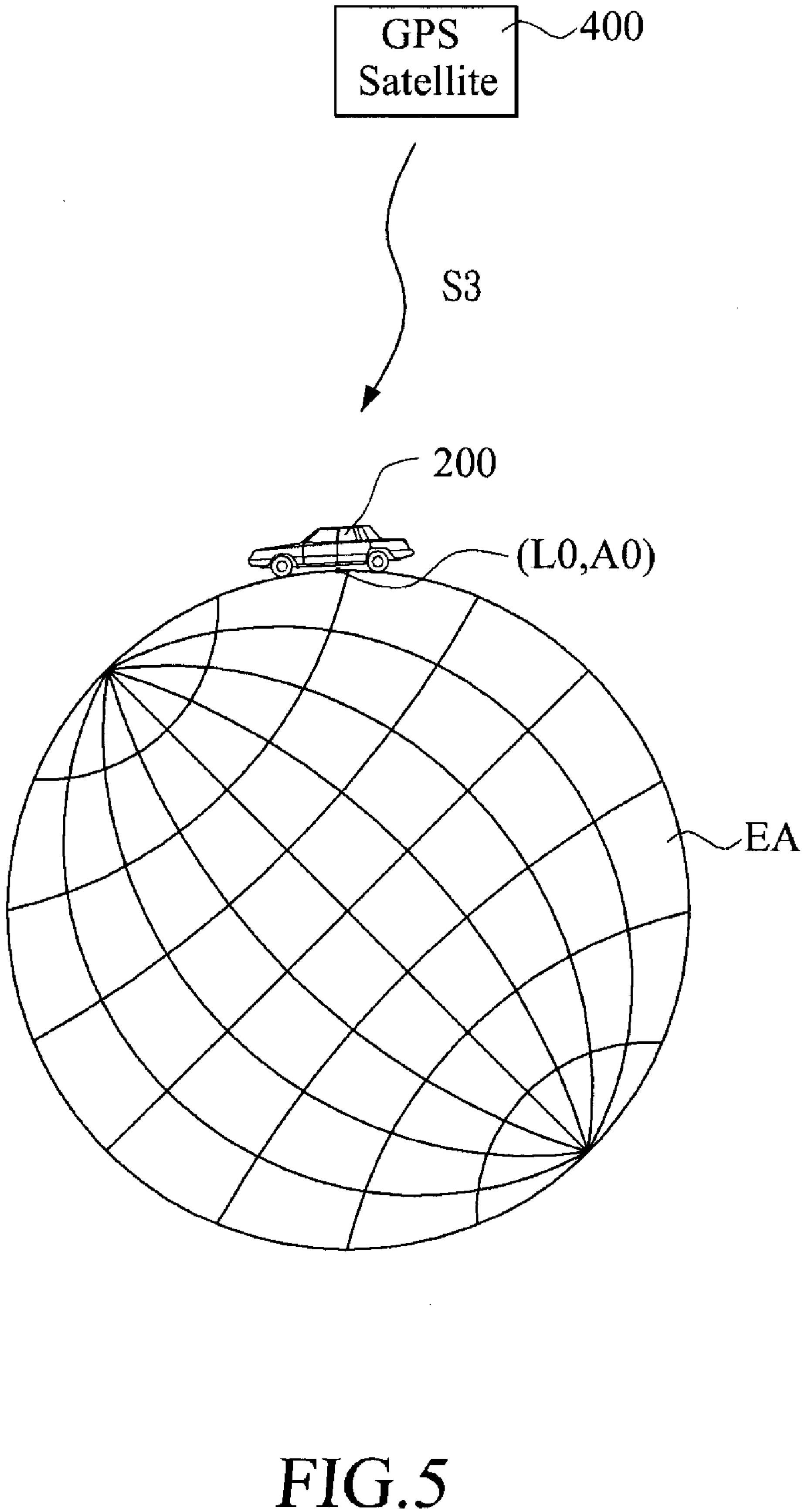
FIG. 5 illustrates the dynamic positioning signal transmitted by GPS to generate the coordinate of the vehicle in the first embodiment of the present invention.
Figure 6:
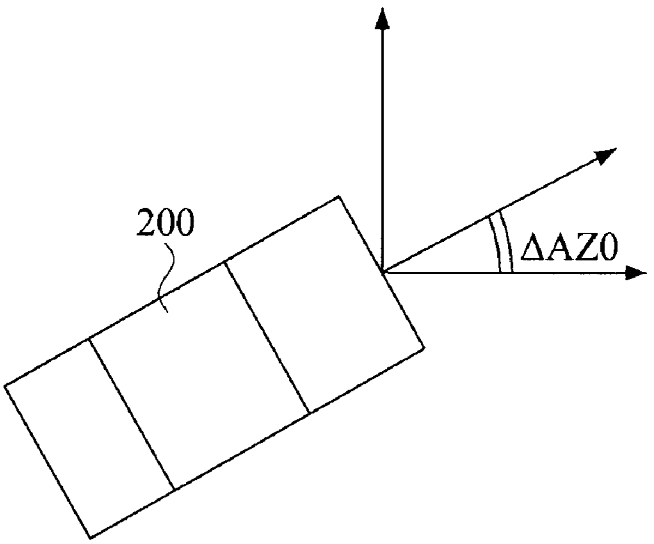
FIG. 6 demonstrates the azimuth angle defined by the vehicle in the first embodiment of the present invention.
Figure 7:
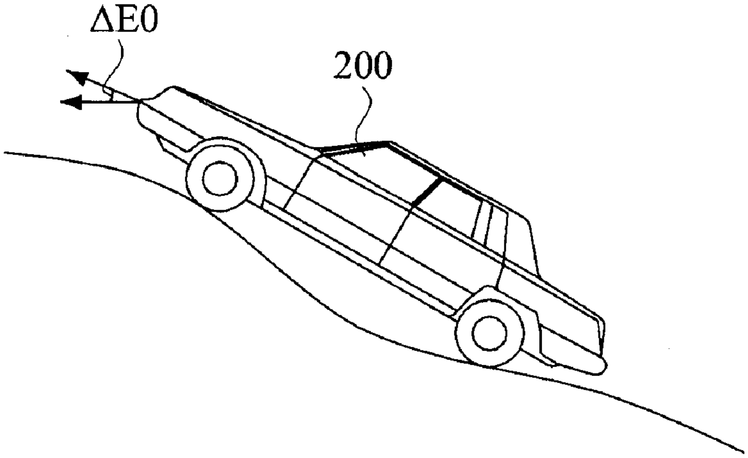
FIG. 7 demonstrates the elevation angle defined by the vehicle in the first embodiment of the present invention.

FIG. 5 illustrates a relationship of a GPS satellite and a moving vehicle on the planet, FIG. 6 illustrates the coordinate system defined for the vehicle, FIG. 7 defines an elevation angle of the vehicle, and FIG. 8 tables the vehicle coordinates defined by various satellites.

With the satellite scanning in process, the vehicle 200 can be still in motion. Namely, the vehicle coordinate may be changing during the satellite scanning. To ensure the accuracy in locating the satellite, the real-time vehicle coordinate of the moving vehicle 200 shall be taken into calculation.

In the scanning, the GPS system 41, through the GPS antenna 42, can receive a dynamic position signal S3 from a GPS satellite 400. The signal S3 is then sent to the microprocessor 111 or the data processor 112 for generating a satellite position coordinate (L0, A0) to coordinate the vehicle 200. In general, the coordinate (L0, A0) is defined by the longitude and the latitude. In the present invention, the vehicle position-sensing unit 43 determines a vehicle position for the vehicle 200, and a dynamic position signal S4 according to the vehicle position is formed and further sent to the microprocessor 111 or the data processor 112. The vehicle position can include a vehicle azimuth ΔAZ0 and a vehicle elevation ΔE0; i.e., forming a vehicle position (ΔAZ0, ΔE0), in which the ΔAZ0 can be determined by the gyroscope 431 and the ΔE0 by the gravity-sensing element 432. In the present invention, both the satellite position coordinate (L0, A0) and the vehicle position (ΔAZ0, ΔE0) can be recorded into the vehicle coordinate memory area 163 of the memory 16. Further, each of the satellite coordinates is assigned an individual satellite number as shown in FIG. 8.

Referring back to FIG. 2, in the case that the vehicle 200 moves to a new location for the user to lock on another satellite after finishing the preceding scanning, detecting and recording, the operational interface 12 is used to select the satellite number (0001 for example) and to send a lock-on signal S5 to the microprocessor 111. Then, the microprocessor 111 and the data processor 112 would retrieve the satellite coordinate (Δθ, ΔΦ) from the satellite coordinate memory area 162, and retrieve also the satellite position coordinate (L0, A0) and the vehicle position (ΔAZ0, ΔE0) from the vehicle coordinate memory area 163. The microprocessor 111 thus applies the GPS system 41 to re-capture a new satellite position coordinate, and also the vehicle position-sensing unit 43 to re-capture a new vehicle position.

According to the downloaded satellite coordinate (Δθ, ΔΦ), the satellite position coordinate (L0, A0), the vehicle position (ΔAZ0, ΔE0), the re-captured satellite position coordinate and the re-captured vehicle position, the microprocessor 111 or the data processor 112 utilizes the operational program 161 to compute the pointing direction of the DVB-S antenna 21, and also further to send an antenna control signal S6 to the driving-control circuit 13. The driving-control circuit 13 would then send a driving signal S7 to the driving unit 3 for properly driving the DVB-S antenna 21 to point at the satellite 0001 (or any of the satellite 300, 300*a* and 300*b*).

Similarly, in the case that the satellite 0002 is the target satellite, the microprocessor 111 and the data processor 112 would retrieve the satellite coordinate (2Δθ, 3ΔΦ) from the satellite coordinate memory area 162, and retrieve also the satellite position coordinate (L0, A0) and the vehicle position (ΔAZ0, ΔE0) from the vehicle coordinate memory area 163. The microprocessor 111 thus applies the GPS system 41 to re-capture a new satellite position coordinate, and also the vehicle position-sensing unit 43 to re-capture a new vehicle position.

According to the downloaded satellite coordinate (2Δθ, 3ΔΦ), the satellite position coordinate (L0, A0), the vehicle position (ΔAZ0, ΔE0), the re-captured satellite position coordinate and the re-captured vehicle position, the microprocessor 111 or the data processor 112 utilizes the operational program 161 to compute the pointing direction of the DVB-S antenna 21, and also further to send an antenna control signal S6 to the driving-control circuit 13. The driving-control circuit 13 would then send a driving signal S7 to the driving unit 3 for properly driving the DVB-S antenna 21 to point at the satellite 0002 (or any of the satellite 300, 300*a* and 300*b*).

In the case that the user is to control the DVB-S/T receiver 18, the operational interface 12 is applied to make the microprocessor 111 to send a control signal S8 to the control signal amplifier 14. The control signal amplifier 14 would then amplify the control signal S8 and further send the amplified signal to the control signal driving circuit 15 to control the DVB-S/T receiver 18.

Prior to receiving the satellite signal S2, the microprocessor 111 downloads at least a digital video data from the memory 16, The digital video signal is transformed into a DVB-T video signal S9 by the encoder 17. Then, the DVB-S/T receiver 18 sends the signal S9 to the VB-T transmitter 19, and the DVB-T transmitter 19 further broadcasts the signal S9 for the digital TVs 500 and 500*a* to receive. Meanwhile, the DVB-T antenna 22 is used to receive the foreign DVB-T video signals and further to restore the DVB-T signals into the memory by the microprocessor 111. The DVB-T transmitter 19 can transform the foreign DVB-T video signal into the respective DVB-T video signal S9 for further broadcasting.

In the art, the DVB-S/T receiver 18 can work with an on-screen display (OSD) interface for performing aforesaid functions of the operational interface 12. Namely, the user can work on the OSD interface to perform operations and controls of the antenna system 100.

As soon as the satellite signal S2 is received, the microprocessor 111 downloads at least a digital video data from the memory 16. The digital video signal is transformed into a DVB-S satellite signal S2 or a DVB-T video signal S9 by the encoder 17. The DVB-S signal S2 is sent to the locked-on satellite by the DVB-S antenna 21, while the signal S9 is sent to the DVB-T transmitter 19 by the DVB-S/T receiver 18. The DVB-T transmitter 19 then broadcasts the signal S9 to be received at far the digital TVs 500 and 500*a*.

Meanwhile, the locked-on satellite (any of satellite 300, 300*a* and 300*b*) sends the satellite signal S2 to the signal control box 1 via the DVB-S antenna 21. The signal S2 is then decoded and further sent to the microprocessor 111 for being transformed into the respective digital satellite (program) data to be stored in the memory 16. Also, the signal S2 is received by the DVB-S/T receiver 18 to be further transformed into the respective DVB-T video signal S9. The DVB-T transmitter 19 then sends out the DVB-T video signal S9 to be received by the digital This 500 and 500*a*. To a person skilled in the art, the control signal S8 for controlling the DVB-S/T receiver 18 is fully understood to be able to help control the transformation and transmission between the signal S2 and the signal S9.

In the preceding description, the first embodiment of the antenna system in accordance with the present invention is believed to be sufficiently understood. In the following description, a second embodiment of the antenna system will be introduced. A major difference between the first embodiment and the second embodiment would be that, in the second embodiment, the construction and functions of the signal control box are moved to another antenna system.

Figure 9:
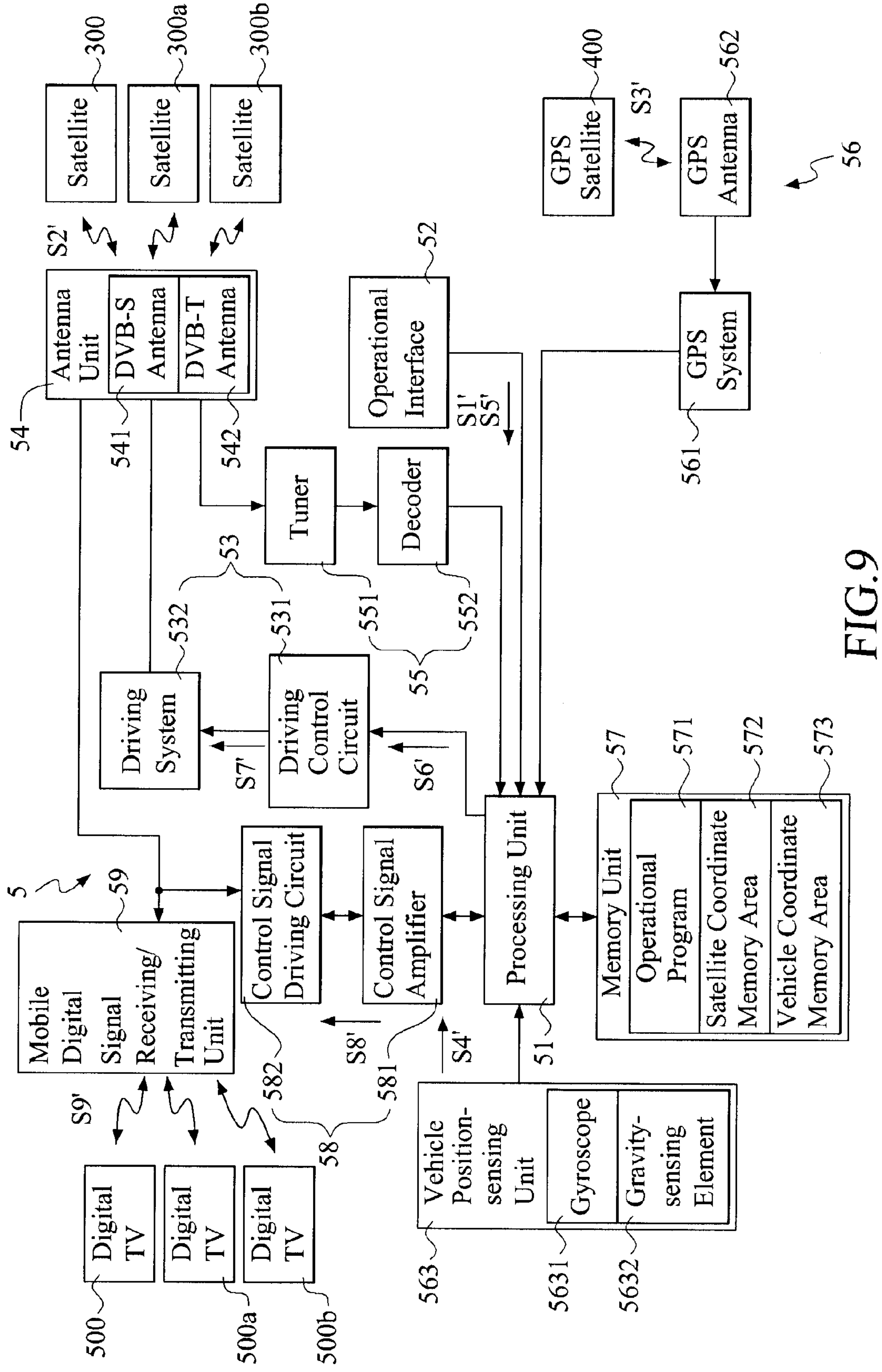
FIG. 9 is a functional block diagram of the second embodiment of the present invention.

Referring now to FIG. 9, the second embodiment of the antenna system in accordance with the present invention is shown. The antenna system 5 mounted on the carrier vehicle 200 (see FIG. 1) includes a microprocessor 51, an operational interface 52, a driving system 53, an antenna unit 54 (for transmitting/receiving), a satellite signal processing circuit 55, a positioning unit 56, a memory unit 57, a control signal processing circuit 58 and a mobile digital signal receiving/transmitting unit 59. Similarly, three prospective satellites 300, 300*a*, and 300*b* are communicationally reachable in the space.

The operational interface 52 coupled with the microprocessor 51 can be an operation panel. The driving system 53 includes a driving control circuit 531 and a driving unit 532. The driving control circuit 531 is coupled electrically with the microprocessor 51, and the driving unit 532 is coupled electrically with the driving control circuit 531 and the antenna unit 54. The antenna unit 54 further includes a DVB-S antenna 541 and a DVB-T antenna 542, in which the DVB-S antenna 541 can be a dish or flat antenna. In the present invention, the driving unit 532 can be a step motor for driving both the DVB-S antenna 541 and the DVB-T antenna 542.

The satellite signal processing circuit 55 includes a tuner 551 and a decoder 552. The tuner 551 is coupled with the antenna unit 54, and the decoder 552 is coupled in between with the tuner 551 and the microprocessor 51. The positioning unit 56 includes a GPS system 561, a GPS antenna 562 and a vehicle position-sensing unit 563. The GPS system 561 couples in between with the GPS antenna 562 and the microprocessor 51. The vehicle position-sensing unit 563 couples the microprocessor 51 and further includes a gyroscope 5631 and a gravity-sensing element 5632.

The memory unit 57 coupled with the microprocessor 51 further includes an operational program 571, a satellite coordinate memory area 572 and a vehicle coordinate memory area 573. The control signal processing circuit 58 includes a control signal amplifier 581 and a control signal driving circuit 582. The control signal amplifier 581 is coupled with the microprocessor 51. The control signal driving circuit 582 is coupled in middle with the control signal amplifier 581, the mobile digital signal receiving/transmitting unit 59 and the antenna unit 54.

In this embodiment shown in FIG. 9, the operational interface 52 is utilized to set up a scanning pattern (for example, a horizontal scanning or a vertical scanning) and other related parameters (such as the range of a scanning angle, the angular increment in scanning, the scanning frequency and so on). The operational interface 52 sends purposely scud a scan-driving signal S1' to the processing unit 51. According to the signal S1', the processing unit 51 would activate the driving unit 532 through the driving-control circuit 531 to drive the DVB-S antenna 541 for a space scanning in accordance with the preset scan pattern and scan parameters. During the space scanning, proper scan data is obtained by receiving the satellite signal S2' sent from the satellite. Then, by analyzing the scanning data and the local peak values, the satellite coordinate of the target satellite can be realized. The satellite coordinate is further stored into the satellite coordinate memory area 572 of the memory 57. For the scanning patterns and the definition of the satellite coordinate system are the same in the first and the second embodiments of the antenna system in accordance with the present invention, the related details would be omitted herein.

Similarly, with the satellite scanning in process, the vehicle 200 can be still in motion. Namely, the vehicle coordinate may be altered from time to time during the satellite scanning. To ensure the accuracy in locating the satellite, the real-time vehicle coordinate of the moving vehicle 200 shall be taken into calculation.

In the scanning, the GPS system 561, through the GPS antenna 562, receives a dynamic position signal S3' from a GPS satellite 400. The signal S3' is then sent to the processing unit 51 for generating a satellite position coordinate to coordinate the vehicle 200. In the mean time, the vehicle position-sensing unit 563 can determine a vehicle position for the vehicle 200, and a dynamic position signal S4' according to the vehicle position is formed and further sent to the processing unit 51. The vehicle position includes a vehicle azimuth angle and a vehicle elevation angle, in which the azimuth angle can be determined by the gyroscope 5631 and the elevation angle by the gravity-sensing element 5632. Both the satellite position coordinate and the vehicle position are recorded into the vehicle coordinate memory area 573 of the memory unit 57. Further, each of the satellite coordinates is assigned an individual satellite number as shown in FIG. 8.

While the vehicle 200 moves to a new location for the user to lock on another satellite after finishing the preceding scanning, detecting and recording, the operational interface 52 is used to select the satellite number and send a lock-on signal S5' to the processing unit 51. Then, similar to the description of the first embodiment, an antenna control signal S6' is sent to the driving-control circuit 531, The driving-control circuit 531 would then send a driving signal S7' to the driving unit 532 for properly driving the DVB-S antenna 541 to point at the purpose satellite.

In the case that the user is to control the mobile digital signal receiving/transmitting unit 59, the operational interface 52 is applied to make the processing unit 51 send a control signal S8' to the control signal amplifier 581. The control signal amplifier 581 would then amplify the control signal S8' and send the amplified signal to the control signal driving circuit 582 for accordingly control the mobile digital signal receiving/transmitting unit 59.

Prior to receiving the satellite signal S2', the microprocessor 51 downloads at least a digital video data from the memory unit 57. The digital video signal is transformed into a DVB-T video signal S9' by the mobile digital signal receiving/transmitting unit 59 to be further broadcasted to reach the digital TVs 500, 500*a* and 500*b*. Meanwhile, the DVB-T antenna 542 is used to receive the foreign DVB-T video signals and further to restore the DVB-T signals into the memory unit 57 by the processing unit 51. Else, the mobile digital signal receiving/transmitting unit 59 can transform the foreign DVB-T video signal into the respective DVB-T video signal S9' for further broadcasting.

As soon as the satellite signal S2' is received, the processing unit 51 downloads at least a digital video data from the memory unit 57. The digital video signal is transformed into a DVB-S satellite signal S2' or a DVB-T video signal S9' by the mobile digital signal receiving/transmitting unit 59. Then, the DVB-S satellite S2' is sent to the locked-on satellite 300, 300*a* or 300*b*, while the DVB-T video signal S9' is sent by the mobile digital signal receiving/transmitting unit 59 to be received by the digital TVs 500, 500*a* or 500*b*.

In the mean time, the locked-on satellite (any of satellite 300, 300*a* and 300*b*) sends the satellite signal S2' to the tuner 551 via the DVB-S antenna 541 for further modulation. The tuned signal S2' is then decoded by the decoder 552 and further sent to the processing unit 51 for being transformed into the respective digital satellite (program) data to be stored in the memory unit 57.

In addition, the locked-on satellite also send sends the satellite signal S2' via the DVB-S antenna 541 to the mobile digital signal receiving/transmitting unit 59 so as to have the signal S2' being transformed into the respective DVB-T video signal S9'. The DVB-T video signal S9' is further broadcasted to be received by the digital TVs 500, 500*a* and 500*b*. To a person skilled in the art, the control signal S8 for controlling the mobile digital signal receiving/transmitting unit 59 is fully understood to be able to help control the transformation and transmission between the signal S2' and the signal S9'.

Figure 10:
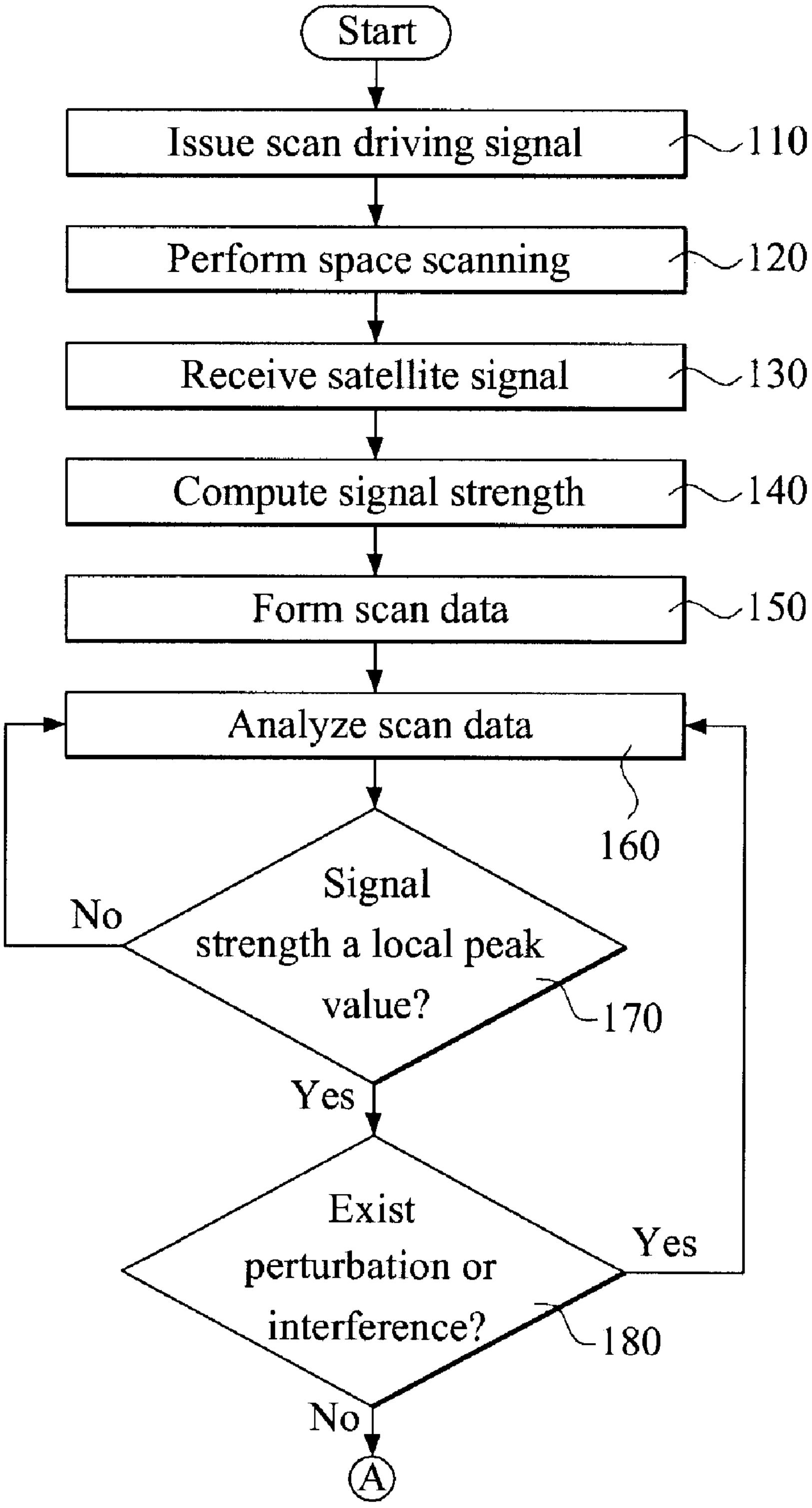
FIG. 10 AND FIG. 11 are integrated to illustrate a flowchart both applied to the first and the second embodiments in accordance with the present invention.
Figure 11:
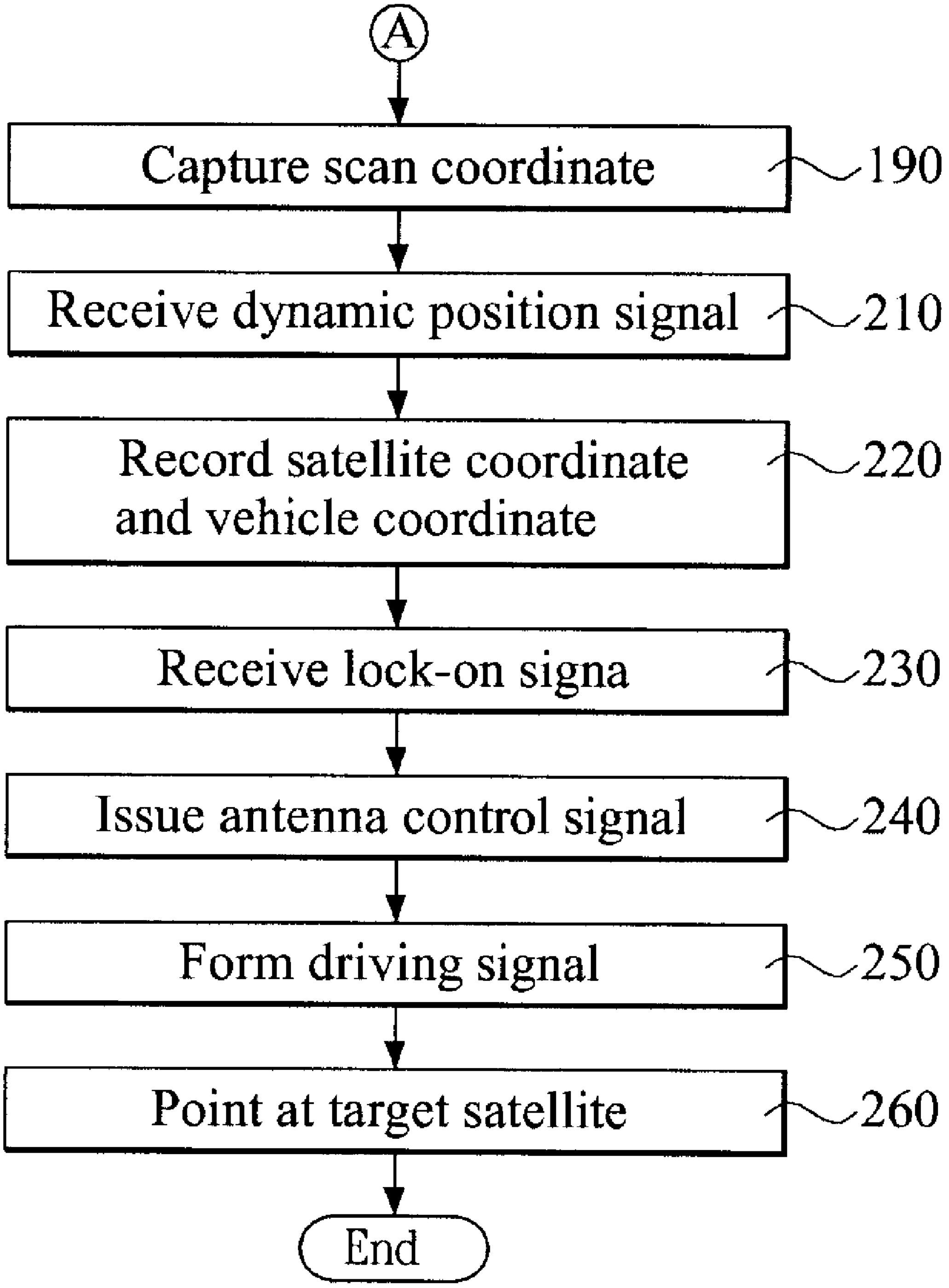

Referring now to FIG. 10 and FIG. 11, continuing flowcharts applicable to both the aforesaid first and second embodiments of the antenna system in accordance with the present invention are shown. Also, refer to FIG. 2 for the following description.

As shown, in the first embodiment, the operational interface 12 is firstly used to generate a scan-driving signal S1 and further to send the S1 to the processing unit 11 (Step 110). The S1 is used to have the processing unit 11 to initiate the DVB-S antenna 21 to perform a space scanning (Step 120).

Then, the DVB-S antenna 21 receives satellite signal S2 from the satellite 300, 300*a* or 300*b* (Step 130). The received satellite signal S2 is used to realize the individual signal strengths with respect to plural scan coordinates (P00-P33 for example) (Step 140). A table as shown in FIG. 4 to present the scan result is thus formed by pairing the signal strengths with the respective scan coordinates (Step 150).

An analysis is performed upon the scan result (Step 160) to determine if a local peak value exists (Step 170), If negative, the system performs Step 160. If positive, it is determined if the peak value is a result of perturbation or signal interface (Step 180). If positive in Step 180, the system loops to Step 160. If negative in Step 180, the scan coordinates are recorded/captured with respect to the instant peak value (Step 190).

Refer now to FIG. 11. As soon as the effective scan coordinate is confirmed, the satellite coordinate is then determined (Step 210) from the scan coordinate. Also, in Step 210, the dynamic position signal S3 from the GPS satellite and the dynamic position signal S4 for the vehicle position are received for realizing the respective vehicle coordinate of the antenna, in which the vehicle coordinate includes the satellite position coordinate and the vehicle position.

In Step 220, store the satellite coordinate and the vehicle coordinate into the satellite coordinate memory area 162 and the vehicle coordinate memory area 163 of the memory unit 16, respectively.

Then, the operational interface 12 is used again to choose the target satellite to be locked on. As soon as the target satellite is determined, a lock-on signal S5 is sent to the processing unit 11. Accordingly, the processing 11 then captures the satellite coordinate with respect to the target satellite (Step 230). In the following Step 240, the processing unit 11 sends the antenna control signal S6 to the driving control circuit 13, according to the satellite coordinate and the vehicle coordinate. In accordance with the S6, the driving control circuit 13 is then to send the driving signal S7 to the driving unit 3 (Step 250). Finally, the driving unit 3 would drive the DVB-S antenna 21 to point at the target satellite, according to the S7 (Step 260).

By providing the antenna system of the present invention, real-time and precise coordinates of the antenna and the carrier vehicle can be obtained. Upon such an arrangement, possible position deviations resulted from aging, wearing and antenna movement can then be effectively compensated. Thereby, accuracy in tracking the satellite and quality in satellite communication can then be ensured.

While the present invention has been particularly shown and described with reference to a preferred embodiment, it will be understood by those skilled in the art that various changes in form and detail may be without departing from the spirit and scope of the present invention.

We claim:

1. A satellite signal control box, coupled with at least one antenna unit mounted on a vehicle through a driving system to drive the antenna unit to point at at least one of a plurality of satellites in the space, comprising:

an operational interface unit generating a scan driving signal representative of a scan pattern and scan coordinates, a processor unit coupled to said operational interface unit to receive said scan driving signal therefrom and generating an activating signal responsive thereto, a driving control circuit coupled to said processor unit to receive said activating signal therefrom, said driving control unit being coupled to a driving unit, said driving control unit activating said driving unit to trigger an antenna unit to perform scan in the space in accordance with said scan pattern and scan coordinates, said antenna unit, simultaneously with said space scanning, capturing satellite signals from at least one of a plurality of satellites in the scanned space upon meeting said scan coordinates, said satellite signals including scan data, wherein said scan data includes peak values of the satellite signals strength.

said processing unit being further coupled to said driving control circuit for analyzing the scan data to obtain satellite coordinates of said at least one satellite based on said peak values of said satellite signals strength in correspondence to said scan coordinates; and a memory unit coupled to said processing unit for storing the satellite coordinates of said at least one satellite;

wherein said operational interface unit elects a target satellite to be locked on among said plurality thereof, and sends a lock-on signal to said processing unit, wherein, upon receiving said lock-on signal from said operational interface unit, the processing unit captures the satellite coordinates of said target satellite to be locked according to the lock-on signal;

wherein, upon capturing said satellite coordinate of said target satellite from said memory unit, the processing unit sends an antenna control signal to the driving control circuit according to said satellite coordinates being captured, and the driving control circuit triggers the driving unit to point the antenna unit at the target satellite.

2. The satellite signal control box according to claim 1, wherein said antenna unit includes a digital video broadcasting-satellite (DVB-S) antenna.

3. The satellite signal control box according to claim 2, wherein said antenna unit is a dish antenna.

4. The satellite signal control box according to claim 2, wherein said antenna unit is a flat antenna.

5. The satellite signal control box according to claim 1, wherein said antenna unit has at least one DVB-S antenna and at least one digital video broadcasting-terrestrial (DVB-T) antenna.

6. The satellite signal control box according to claim 1, further including a digital video broadcasting-satellite/terrestrial (DVB-S/T) receiver coupled with said processing unit and said antenna unit.

7. The satellite signal control box according to claim 6, further including a DVB-T transmitter coupled with said DVB-S/T receiver for transmitting at least one DVB-T video signal to at least one digital television.

8. The satellite signal control box according to claim 6, further including an encoder coupled with said processing unit, said DVB-S/T receiver and said antenna unit.

9. The satellite signal control box according to claim 6, further including;

a control signal amplifier coupled with said processing unit for amplifying a control signal generated by said processing unit; and a control signal driving circuit coupled with the control signal amplifier, said DVB-S/T receiver and said antenna unit for controlling said DVB-S/T receiver according to the control signal.

10. The satellite signal control box according to claim 1, wherein said processing unit further couples to a global positioning system (GPS), a GPS antenna being coupled to said GPS for obtaining a satellite position coordinate of said vehicle, said antenna control signal being sent according to the satellite position coordinate of said vehicle and said at least one satellite coordinate.

11. The satellite signal control box according to claim 1, wherein said processing unit further couples to a vehicle position-sensing unit for obtaining a vehicle position of said vehicle, said antenna control signal being sent according to the vehicle position and said at least one satellite coordinate.

12. The satellite signal control box according to claim 11, wherein said vehicle position further includes an azimuth angle of said vehicle and an elevation angle of said vehicle, and wherein said vehicle position-sensing unit further includes:

a gyroscope for determining the azimuth angle; and a gravity-sensing element for determining the elevation angle.

13. The satellite signal control box according to claim 1, wherein said memory unit further includes:

a satellite coordinate memory area for storing said at least one satellite coordinates; and a vehicle coordinate memory area for storing a vehicle coordinate and a vehicle position of said vehicle.

14. The satellite signal control box according to claim 1, wherein said driving unit is a step motor.

15. An antenna system, mounted on a vehicle for automatically locking on at least one of a plurality of satellites in the space according to a lock-on signal, comprising:

an operational interface generating a scan drive signal representative of a scan pattern and scan coordinates;

an antenna device;

a driving system coupled with the antenna unit;

a driving control circuit coupled with the driving unit and receiving said scan driving signal generated by said operational interface to drive the antenna unit for space scanning in accordance with said scan pattern and scan coordinates, wherein said antenna unit captures, during said space scanning, satellite signals from a plurality of satellites in the scanned space upon meeting said scan coordinates, said satellite signals include scan data, wherein said scan data includes peak values of the satellite signals strength;

a processing unit coupled with the driving control circuit for analyzing the scan data to obtain individual satellite coordinates of the satellites based on said peak values of said satellite signals strength in correspondence to said scan coordinates; and a memory unit coupled with the processing unit for storing the satellite coordinates of the satellites;

wherein, upon receiving a lock-on signal for a target satellite from said operational interface, the processing unit captures the respective satellite coordinate of said target satellite from said memory unit according to the lock-on signal; wherein, according to the captured satellite coordinate of the target satellite, the processing unit transmits an antenna control signal to the driving control circuit, the driving control circuit, responsive to said antenna control signal, sends a driving signal to the driving unit to point the antenna unit at the target satellite.

16. The antenna system according to claim 15, wherein said antenna unit is a digital video broadcasting-satellite (DVB-S) antenna.

17. The antenna system according to claim 16, wherein said antenna unit is a dish antenna.

18. The antenna system according to claim 16, wherein said antenna unit is a flat antenna.

19. The antenna system according to claim 15, wherein said antenna unit further has at least one DVB-S antenna and at least one digital video broadcasting-terrestrial (DVB-T) antenna, in which said driving system is coupled with the DVB-S antenna.

20. The antenna system according to claim 15, further including a mobile digital signal receiving/transmitting unit coupled with said antenna unit.

21. The antenna system according to claim 20, further including a control signal processing circuit, the control signal processing circuit further having a control signal amplifier coupled with said processing unit for amplifying a control signal generated from said processing unit.

22. The antenna system according to claim 21, wherein said control signal processing circuit further has a control signal driving circuit coupled with said mobile digital signal receiving/transmitting unit, the control signal amplifier and the antenna unit for controlling said mobile digital signal receiving/transmitting unit according to said control signal.

23. The antenna system according to claim 15, further including a satellite signal processing circuit, the satellite signal processing circuit further including a tuner coupled with said antenna unit for tuning a satellite signal received by said antenna unit.

24. The antenna system according to claim 23, wherein said satellite signal processing circuit further includes a decoder coupled with said tuner.

25. The antenna system according to claim 15, further including:

a global positioning system (GPS) coupled with said processing unit; and a GPS antenna coupled with the GPS for obtaining a satellite position coordinate of said vehicle and further transmitting said antenna control signal according to said satellite position coordinate and said satellite coordinate of said target satellite.

26. The antenna system according to claim 15, further including a vehicle position-sensing unit coupled with said processing unit for obtaining a vehicle position of said vehicle, said antenna control signal being sent according to the vehicle position and said satellite coordinate of said target satellite.

27. The antenna system according to claim 26, wherein said vehicle position further includes an azimuth angle of said vehicle and an elevation angle of said vehicle and said vehicle position-sensing unit further includes:

a gyroscope for determining the azimuth angle; and a gravity-sensing element for determining the elevation angle.

28. The antenna system according to claim 15, wherein said memory unit further includes:

a satellite coordinate memory area for storing said satellite coordinates of said satellites; and a vehicle coordinate memory area for storing a vehicle coordinate and a vehicle position of said vehicle.

29. The antenna system according to claim 15, wherein said driving system is a step motor.

30. A method for driving at least one antenna device to lock on at least one of a plurality of satellites in the space, comprising the steps of:

(a) generating at an operational interface a scan driving signal representative of a scan pattern and scan coordinates, (b) receiving at an antenna unit said scan driving signal from said operational interface to start a space scanning in accordance with said scan pattern and scan coordinates;

(c) capturing, at said antenna unit, satellite signals from the plurality of satellites in the scanned space upon meeting said scan coordinates, said satellite signals include a scan data, wherein said scan data includes peak values of said satellite signal strength;

(d) analyzing, at a processing unit operationally coupled to said antenna unit, the obtained scan data to obtain individual satellite coordinates of the satellites based on said peak values of said satellite signals strength in correspondence to said scan coordinates, and recording the respective satellite coordinates of the satellites in a memory unit;

(e) receiving at said processing unit a lock-on signal generated at said operational interface that defines one of the satellites to be locked as a target satellite, and retrieving from said memory unit the satellite coordinate of the target satellite in accordance with lock-on signal;

(f) sending from said processing unit to a driving control unit an antenna control signal corresponding to the satellite coordinate of the target satellite; and (g) generating at a driving control unit a driving signal according to the antenna control signal to drive the antenna unit to point at the target satellite.

31. The method according to claim 30, wherein said step (d) is accomplished by the steps of:

(d1) said antenna unit performing said space scan according to plural scan coordinates in order to have said scan data containing individual signal strengths with respect to the scan coordinates;

(d2) checking in a predetermined order whether a current one of the signal strengths of said scan data is a local peak value;

(d3) if in said step (d2) said signal strength is a local peak value, checking further whether the peak value is induced by an interface signal (Qd3), otherwise, performing the step (d2); and (d4) if the peak value is not induced by an interference signal, capturing said scan coordinate corresponding to the peak value to be one of said satellite coordinates and going back to perform the step (d2); if the peak value is induced by an interference signal, performing the step (d2).

32. The method according to claim 31, wherein said antenna unit is mounted on a vehicle, said method further includes, between said step (d) and said step (e), the steps of: receiving a dynamic position signal to obtain a vehicle coordinate of said antenna unit, and computing said satellite coordinates.

33. The method according to claim 32, wherein said dynamic position signal is a GPS dynamic position signal and said vehicle coordinate includes a satellite position coordinate of said vehicle.

34. The method according to claim 32, wherein said dynamic position signal is a vehicle dynamic position signal and said vehicle coordinate includes a vehicle position of said vehicle.

35. The method according to claim 32, wherein said antenna control signal is sent in accordance with said satellite coordinate and said vehicle coordinate.

36. The method according to claim 30, wherein said antenna unit is a digital video broadcasting-satellite (DVB-S) antenna.

37. The method according to claim 36, wherein said antenna unit is a dish antenna.

38. The method according to claim 36, wherein said antenna unit is a flat antenna.

* * * * *